United States Patent [19]

Ohkawa

[11] Patent Number: 5,061,563
[45] Date of Patent: Oct. 29, 1991

[54] INFORMATION STORAGE MEDIUM COMPRISING A RECORDING FILM CONTAINING TELLURIUM CHEMICALLY BONDED TO AN ORGANIC CARBON

[75] Inventor: Hideki Ohkawa, Tokyo, Japan

[73] Assignee: Kabushiki Kaisha Toshiba, Kawasaki, Japan

[21] Appl. No.: 331,547

[22] Filed: Mar. 31, 1989

[30] Foreign Application Priority Data

Mar. 31, 1988 [JP] Japan .................. 63-76603

[51] Int. Cl.$^5$ ............................................. G11B 23/00
[52] U.S. Cl. .................................... 428/408; 428/689;
204/192.26; 369/288
[58] Field of Search ................. 369/288; 428/408, 689;
204/192.26

[56] References Cited

U.S. PATENT DOCUMENTS

| | | | |
|---|---|---|---|
| 4,373,004 | 2/1983 | Asano et al. | 428/328 |
| 4,388,400 | 6/1983 | Tabei et al. | 430/346 |
| 4,433,340 | 2/1984 | Mashita et al. | 346/135.1 |
| 4,929,485 | 5/1990 | Ohkawa et al. | 428/64 |

FOREIGN PATENT DOCUMENTS 238095 9/1987 European Pat. Off. .
58-158054 9/1983 Japan .
60-124290 11/1985 Japan .
61-22351 1/1986 Japan .
62-154343 7/1987 Japan .

OTHER PUBLICATIONS

Mashita et al., "Amorphous Te-C Films for an Optical Disk", Proceedings of SPIE the International Society for Optical Eng., vol. 329, 1982, pp. 190-194.

Primary Examiner—Paul J. Thibodeau
Assistant Examiner—Stevan A. Resan
Attorney, Agent, or Firm—Foley & Lardner

[57] ABSTRACT

According to the present invention, an information storage medium is disclosed comprising a substrate, and a recording film, formed on the substrate, comprising tellurium or tellurium alloy, carbon, and hydrogen, the recording film absorbing far-infrared rays in a wavelength range of 25 to 100 $\mu$m by a chemical bonding of tellurium and carbon having a carbon-hydrogen bond. The information storage medium of the present invention has excellent oxidation resistance and its oxidation resistance can be quickly determined. A method is also disclosed for quickly determining the oxidation resistance of a tellurium film when the method used to manufacture the film is unknown.

7 Claims, 4 Drawing Sheets

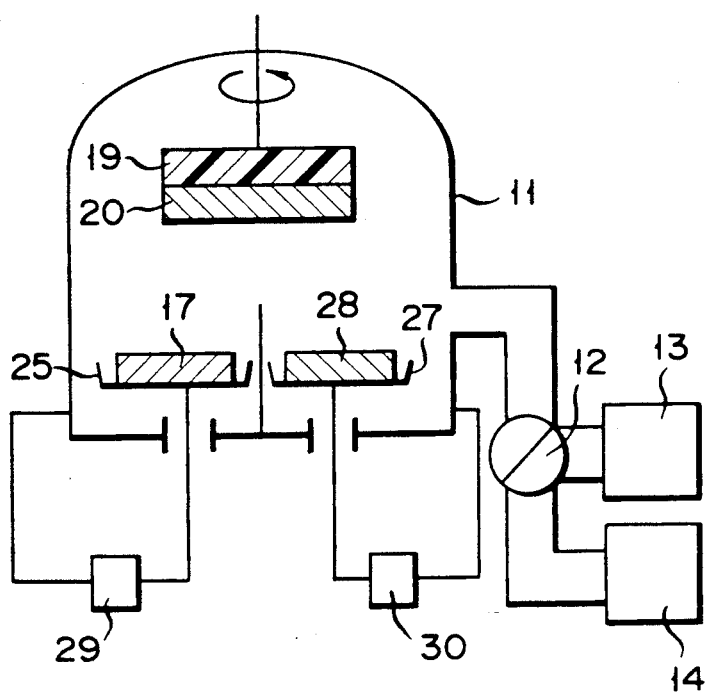
F I G. 3
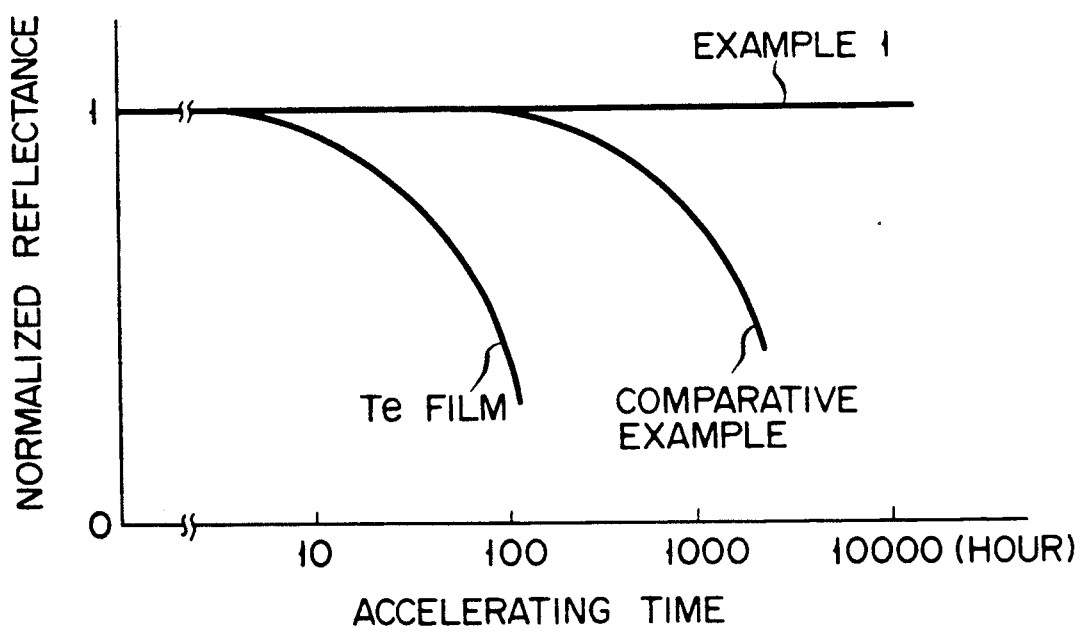
F I G. 4

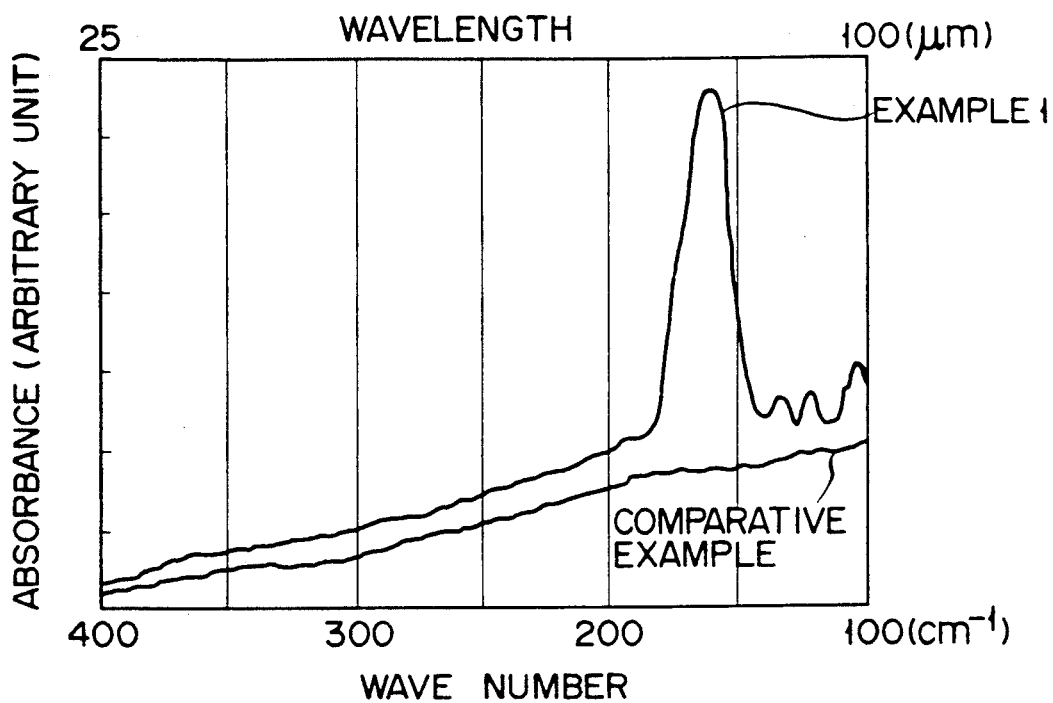
F I G. 5
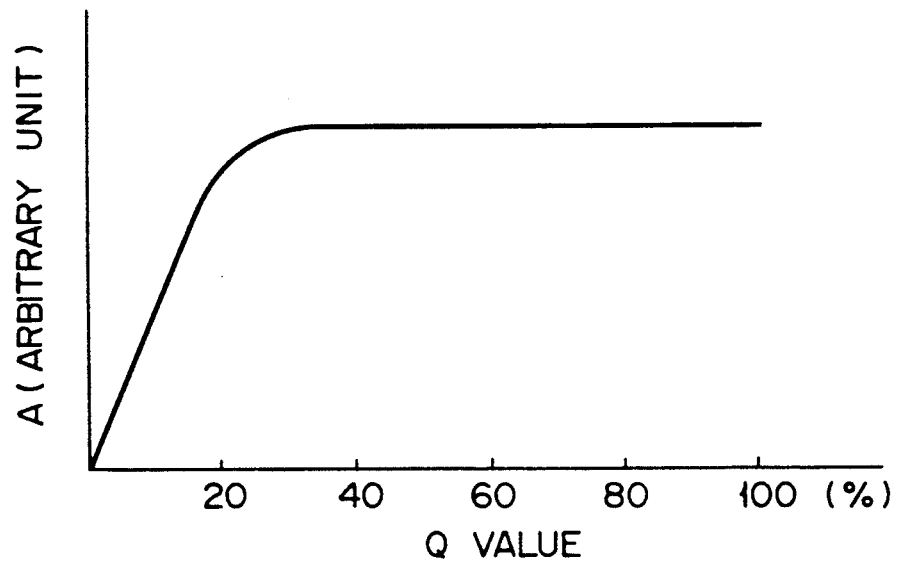
F I G. 6

INFORMATION STORAGE MEDIUM COMPRISING A RECORDING FILM CONTAINING TELLURIUM CHEMICALLY BONDED TO AN ORGANIC CARBON

BACKGROUND OF THE INVENTION

1. Field of the Invention

The present invention relates to an information storage medium having an excellent oxidation resistance that can be quickly determined.

2. Description of the Related Art

Recording films in which information is recorded by forming pits using a semiconductor laser beam are known. For example, tellurium films are known as recording films having high sensitivity. However, tellurium recording films are susceptible to oxidation, and therefore their information write performance (a state wherein pits can be formed in the optical recording film) cannot be maintained for long periods of time.

Attempts have been made to slightly modify the tellurium film while retaining its advantageous characteristics. For example, a recording film containing tellurium and carbon is formed by depositing tellurium and carbon together, hereinafter referred to as a co-deposition Te/C film (W. Y. Lee et al, Proceedings of SPIE 382, 282 (1983)).

In addition, it is known that if a tellurium target is sputtered in an atmosphere of a hydrocarbon gas or mixture of a hydrocarbon gas and an inert gas, an optical recording film having a structure in which tellurium clusters are dispersed in a matrix containing carbon is obtained (U.S. Pat. No. 4,433,340). This is known as a Te/C film.

The co-deposition Te/C film, however, does not have excellent oxidation resistance. However, the recording film containing tellurium and carbon formed by the above sputtering is excellent in oxidation resistance. But, if the manufacturing method used to produce the film is not known, it is difficult to discriminate between these two films based on their appearances. For this reason, oxidation resistance of a film must be determined by performing an acceleration test to check the decrease in reflectance of the film under high temperature and humidity. This test is very time-consuming, taking as long as 1,000 hours or more. A means for quickly determining oxidation resistance has not been proposed yet.

SUMMARY OF THE INVENTION

It is therefore an object of the present invention to provide a means of quickly and easily determining the oxidation resistance of a film containing Te, C, and H when the method used to manufacture the film is not known.

It is a further object of the invention to provide an information recording film characterized by good oxidation resistance.

These and other objects according to the invention are achieved by an information storage medium in which information is read based on an intensity of light reflected from a recording film when reproducing light is applied to the recording film, comprising a substrate and a recording film formed on said substrate that comprises tellurium or tellurium alloy, carbon, and hydrogen, wherein the recording film comprises tellurium chemically-bonded to an organic carbon having a carbon-hydrogen bond, and absorbs far-infrared rays in a wavelength range of 25 to 100 μm.

In a preferred embodiment, the recording film comprises a —$CH_2$— bond of carbon and hydrogen.

The objects of the invention are also achieved by a method for determining the oxidation resistance of an information storage medium when the method of manufacturing the medium is unknown, comprising the step of determining whether the carbon is organic or inorganic carbon by using X-ray photoelectron spectroscopy or far-infrared absorption spectroscopy.

BRIEF DESCRIPTION OF THE DRAWINGS

FIG. 3 is a schematic view of an apparatus for manufacturing a co-deposition Te/C film;

FIG. 4 is a graph showing a result of an oxidation resistance test;

FIG. 5 is a graph of absorption spectra of recording films in a far-infrared wavelength range of 25 to 100 μm;

FIG. 6 is a graph showing a correlation between an absorbance of far-infrared rays and a Q value;

DETAILED DESCRIPTION OF THE PREFERRED EMBODIMENTS

Preferred embodiments of the present invention are described with reference to the drawings. In an information storage medium of the present invention, recorded information is read based on an intensity of light reflected from a recording film when reproducing light is applied to the recording film.

Figure 1:
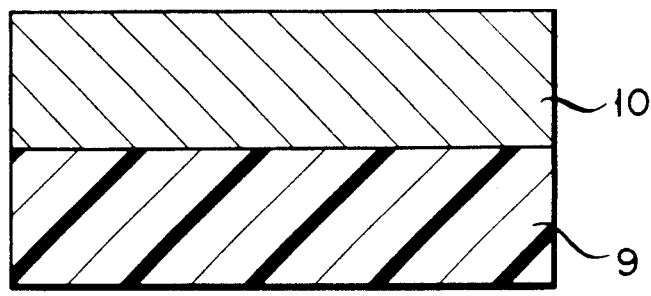
FIG. 1 is a sectional view of an information storage medium according to the present invention.

FIG. 1 is a schematic sectional view showing a structure of the information storage medium according to the present invention. The information storage medium of the present invention comprises substrate 9 and recording film 10 formed thereon.

Substrate 9 is made of a material transparent to a laser beam which is radiated onto the information storage medium so as to record and reproduce information. When a laser beam having wavelength, for example, near the range of near-infrared rays is used, polycarbonate (PC), polymethyl methyacrylate (PMMA), polyolefin, epoxy resin, and the like are used. Alternatively, when a write or reproducing laser beam is incident from the recording film side without passing through the substrate, the substrate may be opaque.

Recording film 10 contains Te, C, and H, and has a structure in which Te clusters are dispersed in a C-H matrix where carbon and hydrogen are bonded to each other by chemical bonds. This film is an amorphous film in which no diffraction peak is recognized from any specific diffraction angle by an X-ray diffraction analysis. Information is recorded by forming pits in the recording film. The recording film preferably has a thickness of about 100 to 1,000 Å. If the film thickness exceeds about 1,000 Å, large energy is required to form pits, and hence write sensitivity is degraded since much energy is required to form pits. If it is smaller than about 100 Å, the recording film becomes discontinuous, and probability of formation of pin holes is increased. These pin holes may be erroneously detected as pits in the reading operation. In addition, the pin holes become starting points for oxidation of the recording medium, and hence must be decreased as much as possible.

The information storage medium of the present invention can be obtained by, e.g., sputtering a Te target placed in a vacuum chamber by discharge while feeding a gas mixture of a hydrocarbon gas and an inert gas, and depositing a Te/C film composed of Te and C-H polymer on a substrate placed in the vacuum chamber. The recording film of the present invention will hereinafter be referred to as a Te-C-H film.

According to the present invention, the absorption spectrum of a recording film formed on a substrate in the far-infrared range (wavelength: 25 to 100 $\mu$m) is measured. When a recording film has a mixture of carbon and Te, i.e., when it has the structure of a co-deposition Te/C film, it does not absorb light in the far-infrared range. Only a recording film having a structure in which organic carbon in the form of—$CH_3$ bond, a—$CH_2$ bond or the like is chemically bonded to Te, i.e., a Te-C-H film, absorbs light in the far-infrared range. An absorption spectrum can be measured within an hour by IR spectroscopy. Therefore, according to the invention, discrimination of a Te-C-H film of the present invention from a co-deposition Te/C film, i.e., the determination of oxidation resistance of a film containing Te, C, and H when the method used to manufacture the film is not known can be quickly and easily performed.

The recording films cannot be discriminated from each other by checking the carbon distributions of the recording films in the depth direction by performing Auger electron spectroscopy together with sputter etching. Binding electrons of carbon in a recording film escape outside the film as photoelectrons by X-ray radiation. Binding energy of electrons in carbon is changed depending on the state of chemical bonding of the carbon. The bonding state of C, i.e., whether the carbon is organic or inorganic carbon, can be determined by using an X-ray photoelectron spectroscopy (XPS). In the present invention, it was found that a Te-C-H film can be easily discriminated from a co-deposition Te/C film by checking an XPS peak at 284.7 eV which shows a —$CH_2$—bond.

EXAMPLE 1

A method of forming an information storage medium shown in FIG. 1 will be described below.

Figure 2:
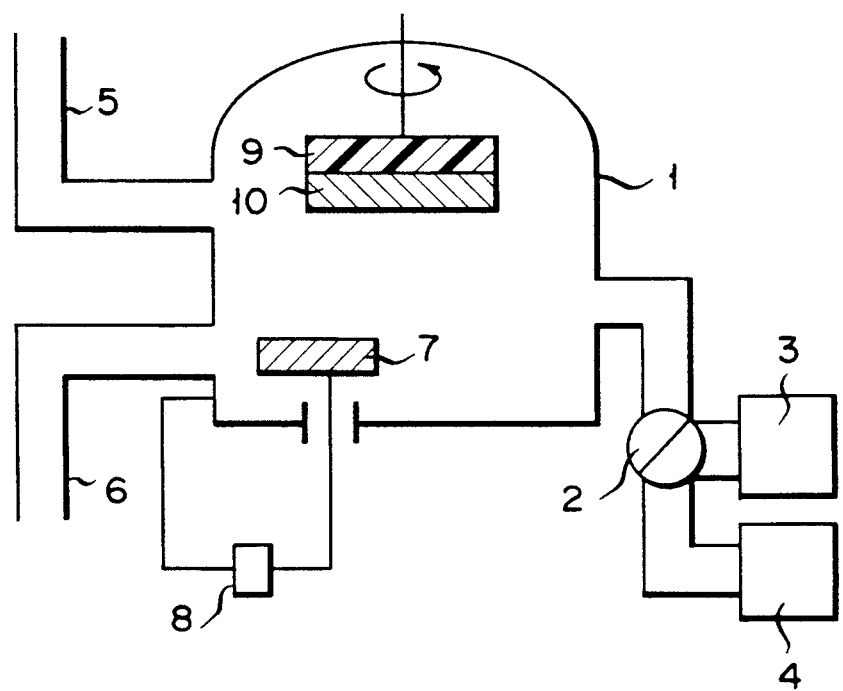
FIG. 2 is a schematic view of an apparatus for manufacturing a recording film according to the present invention.

FIG. 2 is a schematic view of a sputtering apparatus for forming the Te-C-H film of the present invention. Chamber 1 is preliminarily evacuated to 0.2 Torr by setting valve 2 to the rotary oil pump 3 side. Subsequently, valve 2 is set to cryopump 4 side so as to further evacuate chamber 1 to at least $5 \times 10^{-5}$ Torr or less. A $CH_4$ gas and an Ar gas are respectively fed into chamber 1 at 5 SCCM, respectively, through $CH_4$ gas line 5 and Ar gas line 6. Valve 2 is controlled so as to set the pressure in chamber at $5 \times 10^{-3}$ Torr by referring to an ion gauge (not shown), and it is confirmed that this pressure does not change for at least one minute.

Sputtering is performed by applying an electric power of 100 W from power supply 8 to Te target 7 having a diameter of 5 inches. PC substrate 9 is rotated at 60 rpm in advance by a substrate rotating unit (not shown), and recording film (Te-C-H film) 10 containing Te, C, and H is deposited on substrate 9 to a thickness of 300 Å.

In this Example, a $CH_4$ gas is used as a source gas for carbon and hydrogen in the recording film. However, other hydrocarbon gases such as $C_2H_6$, $C_3H_8$, $C_2H_4$, and $C_2H_2$ may be used.

A co-deposition Te-C film was formed as a Comparative Example.

In an apparatus shown in FIG. 3, valve 12 is set to the rotary oil pump 13 side so as to preliminarily evacuate chamber 11 to 0.2 Torr. Valve 12 is then set to the cryopump 14 side so as to further evacuate chamber 11 to at least $5 \times 10^{-5}$ Torr. Subsequently, an electric power of 100 W is applied from deposition heater power supply 29 to tungsten boat (deposition boat) 25 on which Te target 17 having a diameter of five inches is mounted, thereby heating boat 25 and evaporating Te. At the same time, an electric power of 100 W is applied from heating power supply 30 to electron beam heating stage 27 on which charcoal 28 is mounted, thereby evaporating carbon by an electron beam heating method. Simultaneously-evaporated Te and C were deposited on PC substrate 19 to form recording film (co-deposition Te/C film) 20. This recording film has the same thickness as that of the recording film in the Example.

FIG. 4 shows a result obtained by checking changes in reflectance of the two recording films at a temperature of 60° C. and a humidity of 90%. Reflectances are normalized assuming that a reflectance immediately after the formation of each film is 1. For the sake of comparison, FIG. 4 also shows the reflectance of a Te film having the same thickness. The reflectance of the Te film decreases most rapidly (oxidized). The reflectance of the co-deposition Te/C film decreases less rapidly than the Te film, but much more rapidly than the Te-C-H film. The reflectance of the Te-C-H film is not lowered even after 1,000 hours. Hence, the Te-C-H film has the best oxidation resistance.

FIG. 5 shows far-infrared absorption spectra in the wavelength range of 25 to 100 $\mu$m of the Te-C-H film and the co-deposition Te/C film. As shown in FIG. 5, although C is present in both films, an absorption peak of 160 $cm^{-1}$ (62.5 $\mu$m), which represents a chemical bond of organic carbon C and Te, was found only in the Te-C-H film. Therefore, whether absorption in the far-infrared range is found or not is a criterion for judging oxidation resistance.

When the results shown in FIGS. 4 and 5 are compared, it is clear that determination of oxidation resistance of a recording film containing Te, C, and H can be performed faster by checking the magnitude of absorbance A at a wave number of 160 $cm^{-1}$, which is an index representing the amount of Te chemically bonded to organic carbon C in a recording film, than by an acceleration test requiring a period of time as long as 1,000 hours or more.

FIG. 6 shows a relationship between ratio Q of flow rate X of a hydrocarbon gas ($CH_4$ gas) and flow rate Y of a rare gas (Ar gas) in a manufacturing process of a Te-C-H film (Q={X/(X+Y)}×100%) and absorbance A.

It is apparent that absorbance A is substantially constant as long as Q is 20% or more. Constant absorbance A means that the number of chemical bonds of organic carbon C and Te is not changed in the film.

EXAMPLES 2-9

A recording film containing a Te alloy, C, and H is formed for each Example under the same conditions as those in Example 1 except that the Te target in Example 1 is replaced with an alloy target of Te and Se, Ge, Bi, Pb, Sn, Ag, In or Ga. Absorption of far-infrared rays due to a chemical bond of a Te alloy and organic carbon C in each recording film fell within the range of 25 to 100 μm (400 to 100 cm$^{-1}$).

EXAMPLE 10

Figure 7:
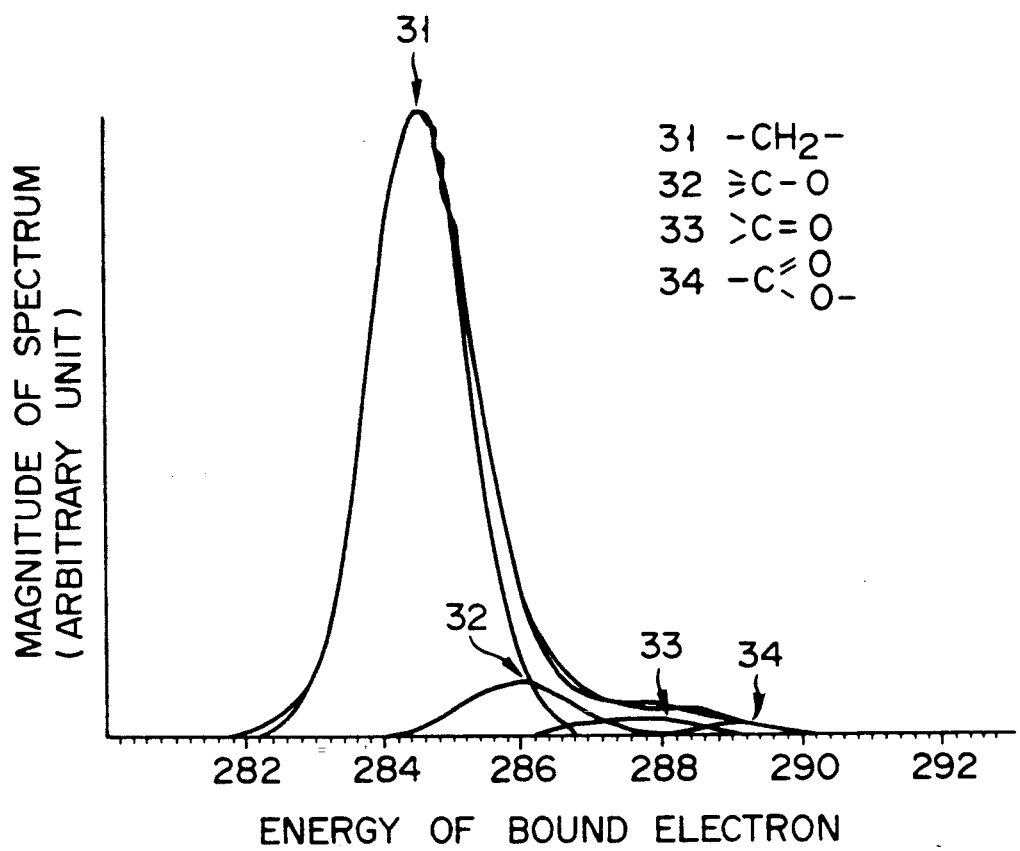
FIG. 7 is an XPS graph of the recording film according to the present invention.

FIG. 7 shows X-ray photoelectron spectra (XPS) from the orbital $C_{1S}$ of the Te-C film obtained in Example 1. As is apparent from FIG. 7, the main peak of a—$CH_2$— bond appears at 284.7 eV, and small peaks of a

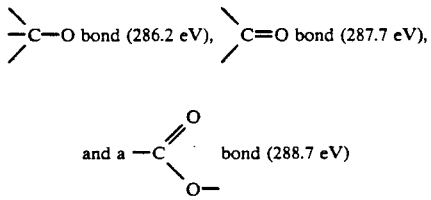

are present. That is, carbon is mainly present as the—$CH_2$—bond in the Te-C-H film.

Figure 8:
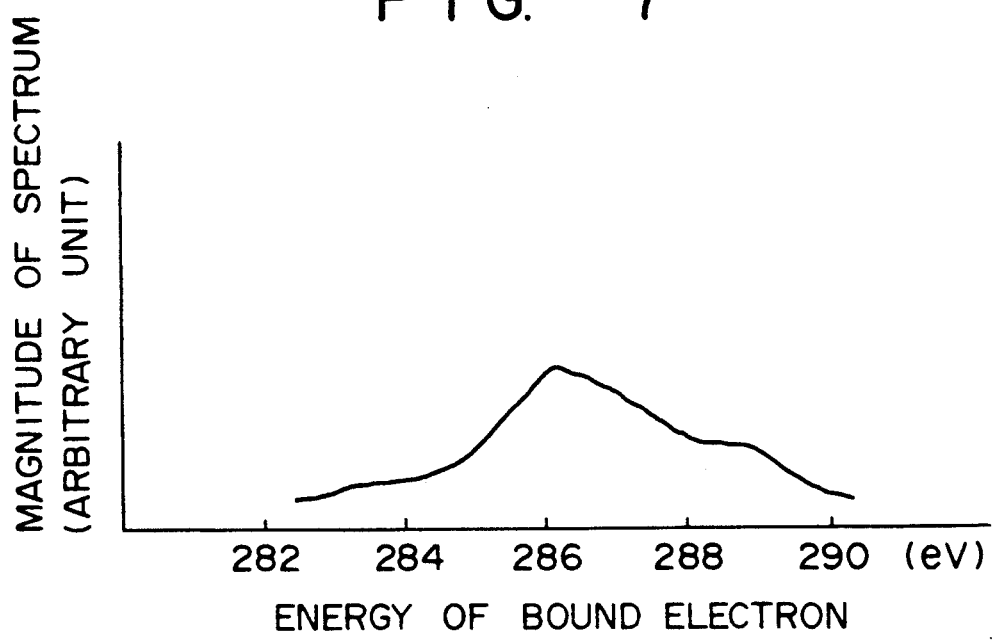
FIG. 8 is an XPS graph of a co-deposition Te/C film.

FIG. 8 shows an XPS spectrum obtained from the co-deposition Te/C film (C, which is not bonded with H and O, is bonded with Te) obtained in the Comparative Example. In this spectrum, a peak at 284.7 eV representing a—$CH_2$—bond does not appear.

It is apparent from both the spectra that if an XPS peak representing a—$CH_2$—bond is obtained from a given film, this film is a Te-C-H film. Since XPS measurement can be performed within an hour, discrimination of a Te-C-H film from a co-deposition Te-C film can be quickly performed by this method.

What is claimed is:

1. An information storage medium comprising:
   a substrate; and
   a recording film, supported on said substrate, comprising tellurium or tellurium alloy, carbon, and hydrogen, said recording film comprising tellurium chemically bonded to an organic carbon having a carbon-hydrogen bond and absorbing far-infrared rays in a wavelength range of 25 to 100 μm.

2. The information storage medium according to claim 1, wherein said recording film is formed by depositing tellurium by sputtering in an atmosphere of a hydrocarbon gas and a rare gas.

3. An information storage medium comprising
   a substrate; and
   a recording film, supported on said substrate, comprising tellurium or tellurium alloy, carbon, and hydrogen, said recording film comprising tellurium chemically bonded to an organic carbon having a carbon-hydrogen bond and having a—$CH_2$—bond of carbon and hydrogen, said recording film absorbing far-infrared rays in a wavelength range of 25 to 100 micrometers.

4. The information storage medium according to claim 3, wherein said recording film is formed by depositing tellurium by sputtering in an atmosphere of a hydrocarbon gas and a rare gas.

5. A medium according to claim 1, wherein said recording film absorbs far-infrared rays in a wavelength range of about 62.5 micrometers.

6. A medium according to claim 1, wherein said recording film is formed by a sputtering process with a mixed gas of a rare gas and a hydrocarbon gas used as a sputtering gas, the hydrocarbon content in the sputtering gas being 20% or more.

7. A medium according to claim 3, wherein said —$CH_2$—bond is confirmed by X-ray photoelectron spectroscopy.

* * * * *